United States Patent
Buchter et al.

(10) Patent No.: US 8,657,506 B2
(45) Date of Patent: Feb. 25, 2014

(54) FIELD TERMINATING METHOD AND DEVICE

(75) Inventors: Shelly Ann Buchter, East Berlin, PA (US); Sean Patrick Kelly, York, PA (US); Douglas Allen Kirsch, Shiremanstown, PA (US); David Donald Erdman, Hummelstown, PA (US); David William Cormany, Dauphin, PA (US); Terry Patrick Bowen, Dillsburg, PA (US); Craig Bryan Kegerise, Middletown, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 36 days.

(21) Appl. No.: 13/331,328

(22) Filed: Dec. 20, 2011

(65) Prior Publication Data

US 2013/0156378 A1    Jun. 20, 2013

(51) Int. Cl.
*G02B 6/36* (2006.01)

(52) U.S. Cl.
USPC ............................................. 385/87; 385/76

(58) Field of Classification Search
USPC ....................................................... 385/76–87
See application file for complete search history.

(56) References Cited

U.S. PATENT DOCUMENTS

| | | | |
|---|---|---|---|
| 6,230,387 B1 | 5/2001 | Gritters et al. | |
| 7,346,256 B2 | 3/2008 | Marrs et al. | |
| 7,988,367 B2 | 8/2011 | Gurreri et al. | |
| 2004/0057672 A1* | 3/2004 | Doss et al. | 385/76 |
| 2005/0210668 A1 | 9/2005 | Palmer et al. | |
| 2006/0002662 A1* | 1/2006 | Manning et al. | 385/78 |
| 2006/0265881 A1 | 11/2006 | Serrano et al. | |
| 2007/0127873 A1 | 6/2007 | Manning et al. | |
| 2007/0147741 A1 | 6/2007 | Meek et al. | |
| 2007/0172179 A1 | 7/2007 | Billman et al. | |
| 2007/0196054 A1 | 8/2007 | Palmer et al. | |
| 2009/0269014 A1* | 10/2009 | Winberg et al. | 385/78 |
| 2009/0317037 A1* | 12/2009 | Milette et al. | 385/83 |
| 2010/0054670 A1* | 3/2010 | Milette et al. | 385/83 |

* cited by examiner

*Primary Examiner* — Charlie Peng
*Assistant Examiner* — Mary El Shammaa

(57) ABSTRACT

A method of terminating a fiber in a connector using a device comprising: (a) positioning a stripped fiber on the device such that the bare fiber portion extends into a first fiber channel of a cleaver; (b) securing the fiber to a fiber retainer slidably attached to the substrate to move along an x axis at a first position; (c) cleaving the bare fiber portion to form a cleaved end; (d) sliding the fiber retainer away from the cleaver along the x axis; (e) causing to be presented a second fiber channel of a connector held in a connector retainer along the x axis; (f) sliding the fiber retainer to the first position along the x axis, thereby causing the cleaved end to extend into the second fiber channel; and (g) actuating the connector while the fiber retainer is at the first position.

19 Claims, 5 Drawing Sheets

FIELD TERMINATING METHOD AND DEVICE

FIELD OF INVENTION

The present invention relates generally to field terminating connectors, and, more specifically, to a single device and simple method for field terminating fibers.

BACKGROUND OF INVENTION

Optical fiber connectors are an essential part of practically all optical fiber communication systems. For instance, such connectors are used to join segments of fiber into longer lengths, to connect fiber to active devices such as radiation sources, detectors and repeaters, and to connect fiber to passive devices such as switches and attenuators. The principal function of an optical fiber connector is to optically couple a fiber with a mating device (e.g., another fiber, an active device or a passive device). This is achieved by holding the end of the fiber in a ferrule such that the core of the fiber is axially aligned with the optical pathway of the mating device.

To facilitate an effective optical coupling, the end face of the ferrule is typically polished. Preparing a polished ferrule is a sophisticated process. It requires cleaving the fibers, terminating them in a ferrule (typically by using an epoxy), and polishing the ferrule to exacting tolerances. Therefore, such a process is usually performed in a controlled setting with precision equipment by skilled personnel. Frequently, however, connectors must be terminated in the field where such facilities and personnel are not available. Under these conditions, it is desirable to omit the step of the polishing the ferrule by instead terminating the fiber in a connector which has a fiber stub already terminated in a polished ferrule. Because the ferrule is already polished in a fiber-stub, field-installable connector, field installation requires only optically coupling the fiber to the fiber stub. This is often done with using a refractive index matched gel to improve optical coupling therebetween.

Although field-installable connectors eliminate the need to polish the ferrule in the field, terminating the fiber to the connector can nevertheless be difficult in the field, where conditions often require the installer to perform this operation without a workbench and using handheld tools. Indeed, the operation is often performed while standing. The process is complicated by the need to use different tools. For example, the fiber would be cleaved with a cleaver, the connector actuated with another tool resembling pliers, and then crimped with a crimper.

Therefore, an approach is needed for simplifying field terminations, allowing a user to terminate the fiber while standing and using a minimal number of hand-held tools. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a system and method for terminating fibers in the field conveniently and precisely. Applicants recognize that field termination is simplified significantly if a single tool can be used to cleave the fiber, actuate the connector to clamp the connector to the fiber, and crimp a compressible member on the connector to the fiber. To this end, the present invention involves a device in which the cleaver and the connector retainer are slidably attached such that they can be slid in and out of place as needed while the fiber remains stationary. This approach not only simplifies field termination, but also enables the user to cleave a fiber, terminate it, and secure it to the connector using a single device and in just a few moves.

One aspect of the present invention is a device having a slidably mounted cleaver and/or connector retainer allowing the fiber to remain essentially along the same axis during the termination process. In one embodiment, the device comprises: (a) a substrate defining x and y axes; (b) a fiber retainer slidably attached to the substrate to slide along the x axis; (c) a cleaver having a first fiber channel and being slidably attached to the substrate to slide along the y axis; and (d) a connector retainer for holding a connector having a second fiber channel and being slidably attached to the substrate to slide along the y axis.

Another aspect of the present invention is a method for cleaving, terminating, and crimping a fiber all in one operation using a single device. In one embodiment, the method comprises: (a) positioning a stripped fiber on the device such that the bare fiber portion extends into a first fiber channel of a cleaver; (b) securing the fiber to a fiber retainer slidably attached to the substrate to move along the x axis at a first position on the x axis; (c) cleaving the bare fiber portion to form a cleaved end; (d) sliding the fiber retainer away from the cleaver along the x axis; (e) causing to be presented a second fiber channel of a connector held in a connector retainer along the x axis; (f) sliding the fiber retainer to the first position along the x axis, thereby causing the cleaved end to extend into the second fiber channel; and (g) actuating the connector while the fiber retainer is at the first position to clamp the cleaved end to the connector.

DETAILED DESCRIPTION

Figure 1:
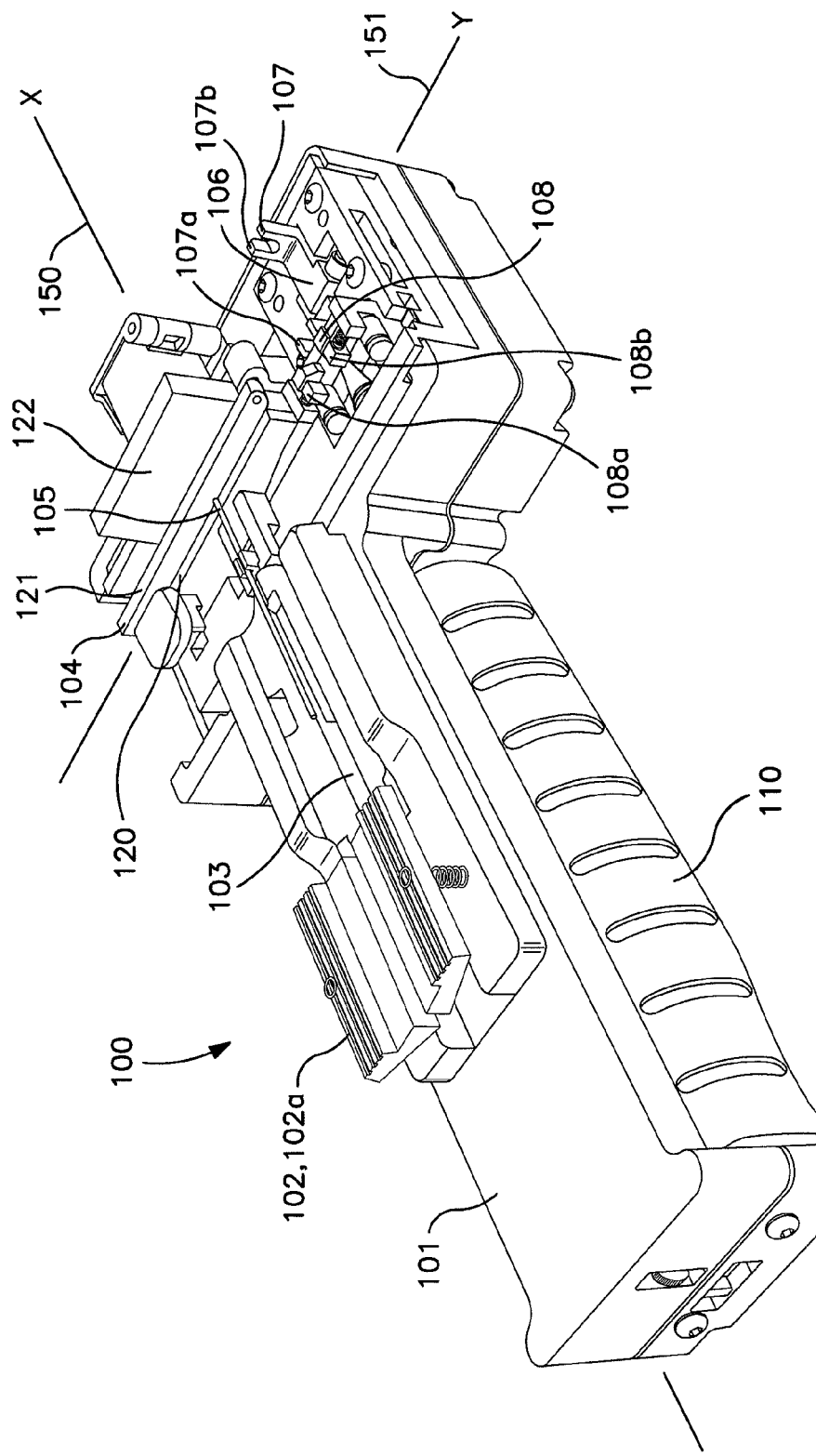
FIG. 1 shows a rear quarter perspective view of the device of the present invention.
Figure 2:
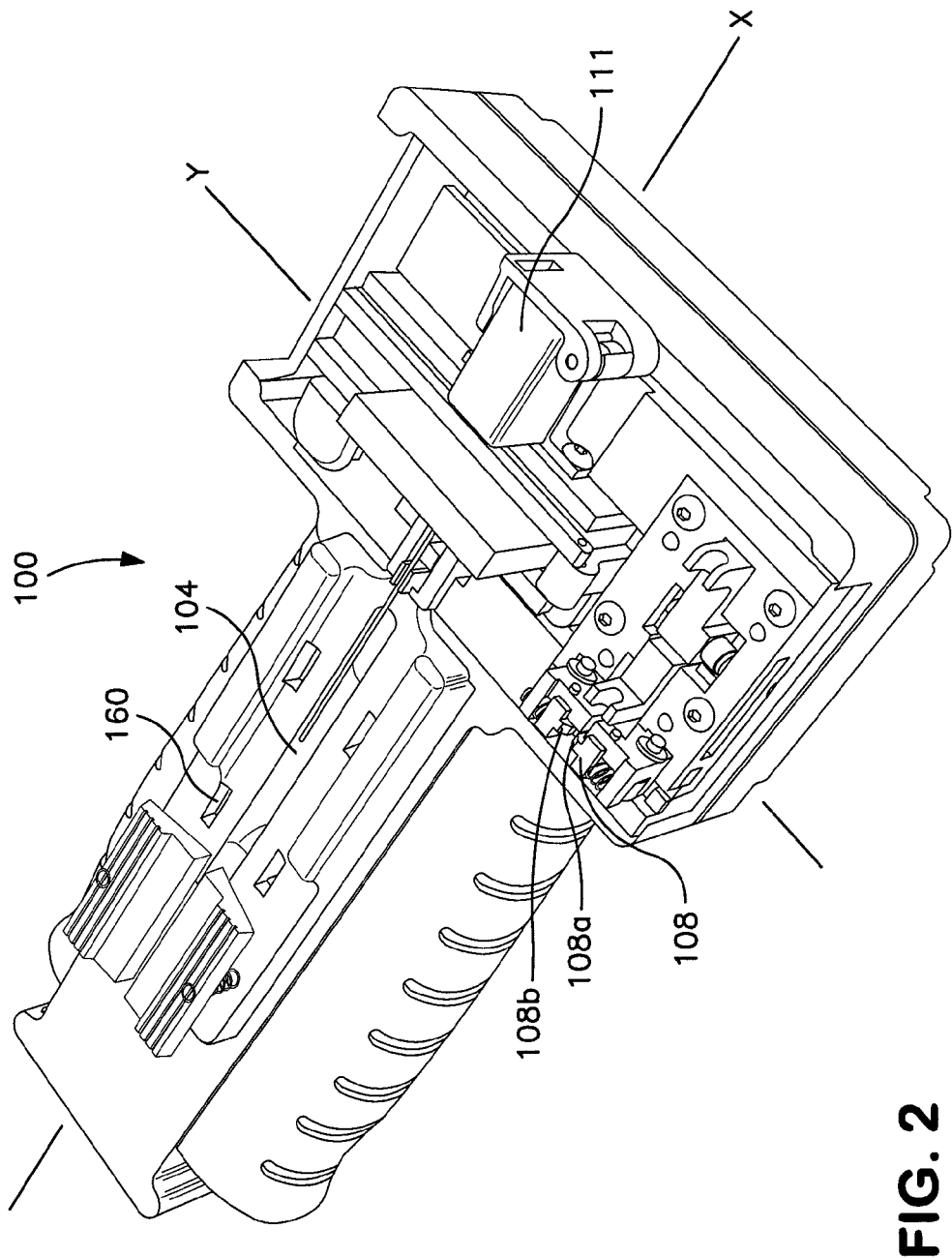
FIG. 2 shows a front quarter perspective view of the device of FIG. 1.

Referring to FIGS. 1-4, one embodiment of the device 100 of the present invention is shown. The device comprises a substrate 100 defining x and y axes, 150, 151; a fiber retainer 102 slidably attached to the substrate 101 to slide along the x axis 150; a cleaver 104 slidably attached to the substrate 101 to slide along the y axis 151; and a connector retainer 106 slidably attached to the substrate 101 to slide along the y axis.

The device of the present invention is configured to terminate a fiber to a connector. In one embodiment, the method comprises (a) positioning a stripped fiber (not shown) having a bare portion extending from a buffered portion on the device such that the bare portion extends into a first fiber channel of a cleaver 104; (b) securing the fiber to a fiber retainer 102 slidably attached to the substrate 101 to move along the x axis 150 at a first position on the x axis; (c) cleaving the bare fiber portion to form a cleaved end (not shown); (d) sliding the fiber retainer 102 away from the cleaver 104 along the x axis; (e) causing to be presented a second fiber channel (not shown) of a connector 501 (see FIG. 5) held in a connector retainer along the x axis; (f) sliding the fiber retainer 102 to the first position 160 along the x axis, thereby causing the cleaved end to extend into the second fiber channel; and (g) actuating the connector while the fiber retainer 102 is at the first position 160 to clamp the cleaved end to the connector.

Details of the device and method are considered in detail below.

The substrate 101 functions to hold the fiber retainer, connector retainer, and cleaver in relative position to each other. The substrate may be in any form suitable for holding the components in relative position to each other. For example, the substrate may be a planar platform, or it may comprise rails or elongated members defining a framework for supporting the various components.

In the embodiment shown in FIG. 1, the substrate 101 is essentially a planar platform and defines x and y axes 150, 151. The fiber retainer 102 moves along the x axis, while the cleaver 104 and connector retainer 106 with its clamper 107 and crimper 108 move along the y axis (described in detail below).

In one embodiment, the substrate also defines a groove 103 in which the fiber rests during cleaving and termination. This groove may also comprise alignment features to precisely position the fiber in the cleaver 104 and connector 501 (see FIG. 5). For example, in the embodiment of FIG. 1, the surface 101 defines a groove 103 for receiving the fiber during the cleaving step (described below). Groove 103 is configured with a wide section 104a and a narrow section 104b (see FIG. 3). The wide section is configured to receive the buffered fiber, while the narrow section is configured to receive the bare fiber 180. Between the two sections is a stop 190 against which the buffer of the fiber abuts when the fiber is pushed toward the cleaver 104. Because the stop 190 is a precise distance from the cleaver 104, the length of bare fiber extending beyond the buffer is controlled with precision.

Figure 3:
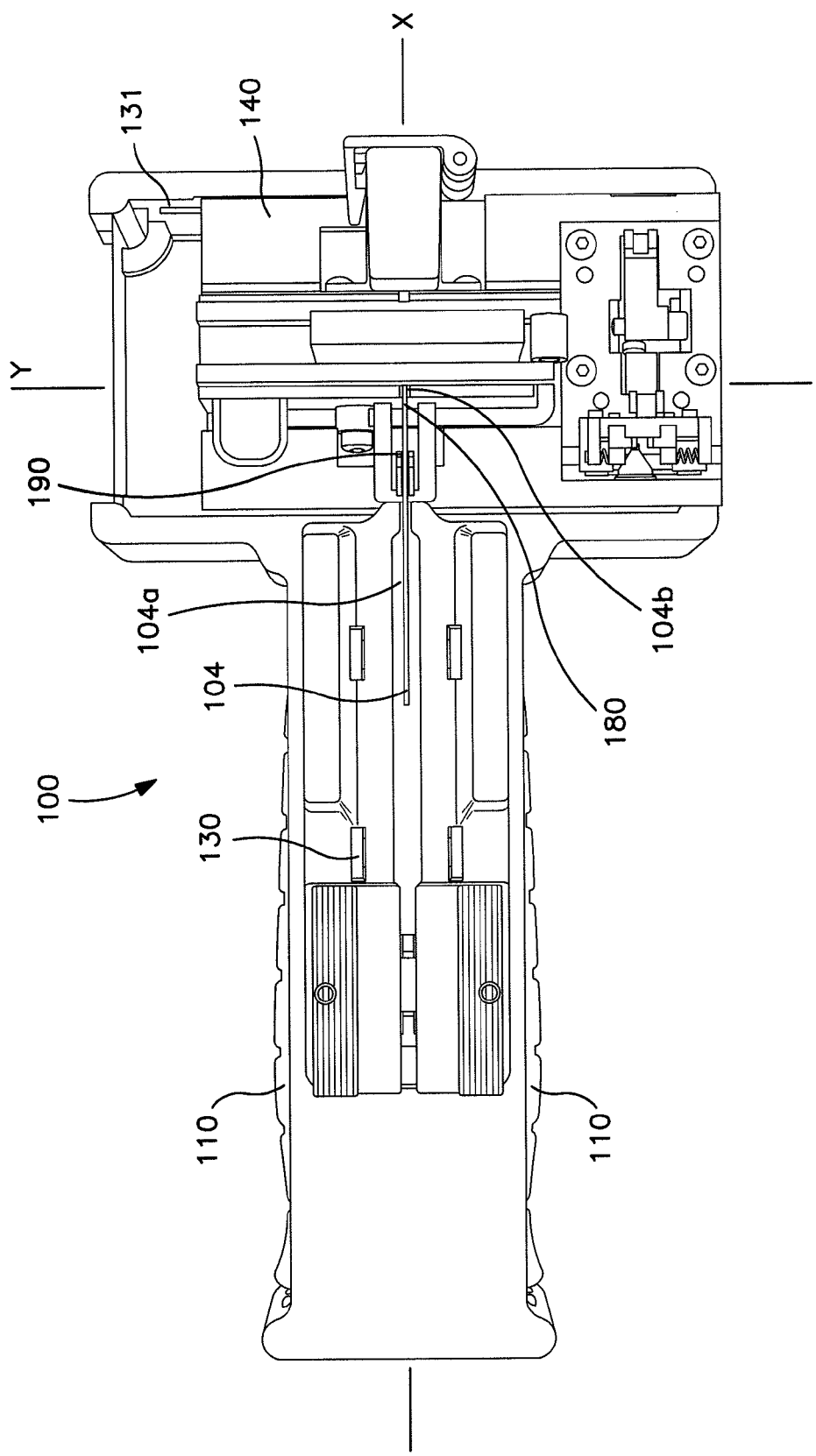
FIG. 3 shows a top view of the device of FIG. 1.
Figure 4:
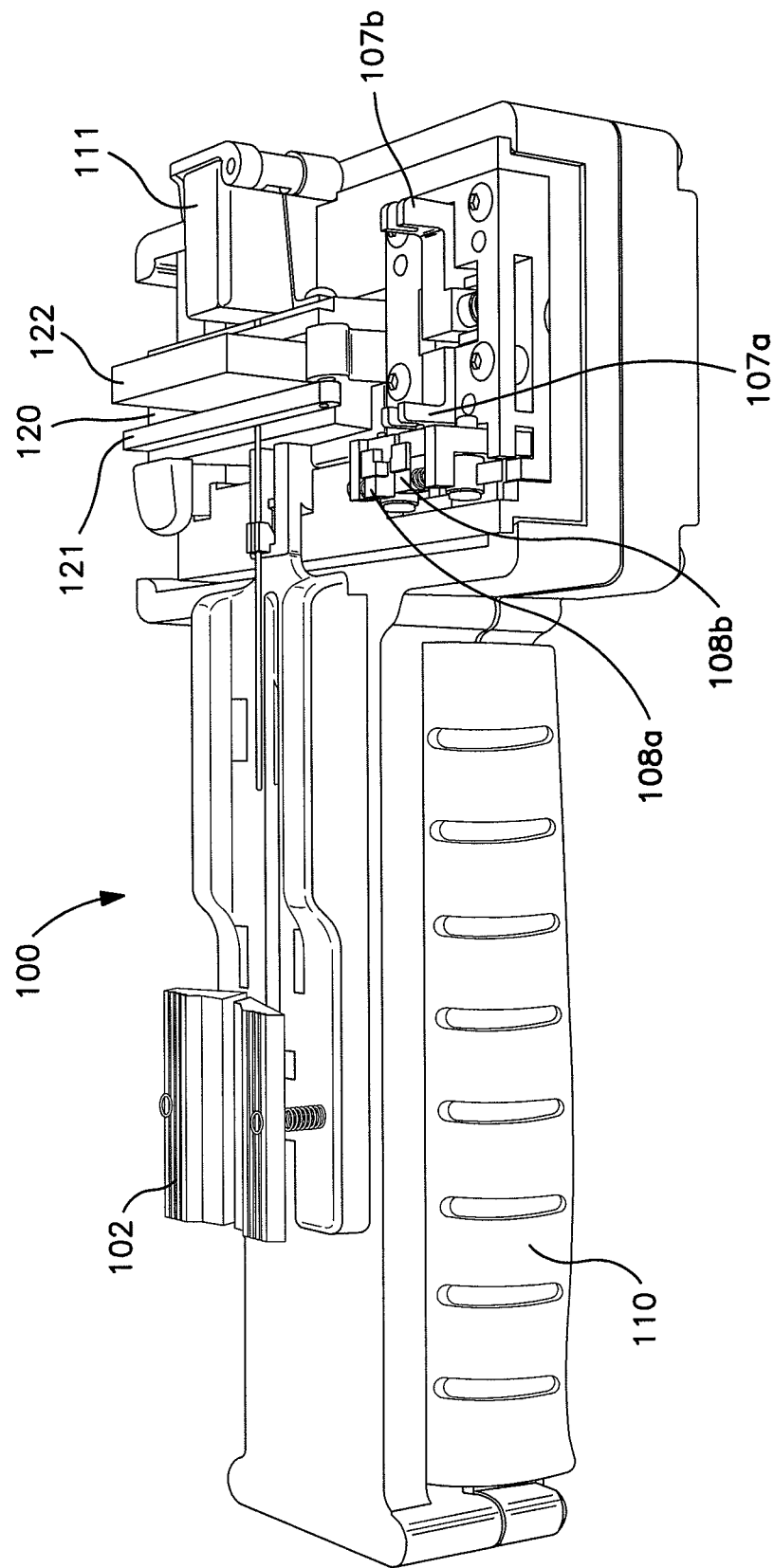
FIG. 4 shows a side perspective view of the device of FIG. 1.

In one embodiment, the substrate has tracks for facilitating the sliding movement of the fiber retainer 102 and the cleaver and connector retainer. Referring to FIG. 3, in one embodiment, x tracks 130 facilitate the sliding of the fiber retainer 102 along the x axis, and y tracks facilitate the sliding of the cleaver 104 and connector retainer 106 along the y axis.

The fiber retainer 102 functions to grip the buffer around the fiber and prevent the fiber from sliding axially or rotating. The term "fiber retainer" is used broadly in this context and refers to a mechanism for holding something. Suitable fiber retainers includes, for example, clamps, clips, wedges, set screws, vices or any other device suitable for securing a buffered fiber. As shown in FIG. 1, the retainer 102 is a clamp having two tabs 102a, which are pivotally mounted and biased closed. The fiber retainer 102 is slidably attached to the substrate. The term "attached" as used in this context refers to either directly or indirectly attached. For example, the fiber retainer may be secured directly to the substrate as in the embodiment of FIG. 1. Alternatively, the fiber clamp may be attached to the substrate via intermediate components.

The cleaver 104 functions to cleave the fiber in a precise and predictable way. Such angle cleavers are known and include, for example, anvil cleavers and guillotines. In the embodiment shown in FIG. 1, an anvil cleaver is used. Specifically, the cleaver 104 comprises an anvil 120 defining a groove (not shown) perpendicular to the fiber channel 105, and a cleaving blade (not shown) slidably attached to an arm 121 pivotally mounted to the anvil 120. Connected to the blade is a handle 122 which allows the user to slide the blade along the groove. When the bare fiber is positioned in the fiber channel 105 such that it extends across the grove, and when the arm 121 is in the down position, the bare fiber is bent over the anvil 120, thereby imparting a tensile force in the bare fiber, such that, when the blade is slid along the groove and scores the bare fiber, the bare fiber immediately breaks predictably along the score line. Such cleavers are well known.

In one embodiment, the connector retainer 106 has multiple functions, including holding the connector 501 (see FIG. 5) in a particular position relative to the substrate (and hence the other components attached to the substrate), compressing the connector to actuate the internal clamping mechanism to secure the fiber to the connector and crimping the compressible member to crimp the compressible member to the fiber. At a minimum, the connector retainer holds the connector such that it presents the fiber channel of the connector along the x axis.

If the connector is an APC-type connector, it is important to hold the connector in a particular position because the connector contains an angle-cleaved fiber stub (not shown). Because the stub is angle cleaved, the position of the connector is critical to effect a good optical coupling. That is, if the connector is rotationally misaligned, the angle cleave of the stub will interfere with the terminating fiber, camming it away and thus creating an air gap and, hence, insertion loss. Consequently, the connector retainer 102 must hold the connector secure to ensure the correct orientation of the angle cleave relative to the substrate.

The connector retainer 106 may be any mechanism capable of holding a connector. Suitable retainers include, for example, clamps, clips, wedges, set screws, vices, straps, hook and loop connectors and even adhesive means, such as tape.

In one embodiment, the connector retainer 106 also comprises a clamper 107 for compressing the connector longitudinally to actuate the clamping mechanism of the connector, thereby securing the fiber to the connector. Such longitudinal compression is a well known technique for actuating field-installable connectors. Traditionally, such an operation was performed using an actuation tool resembling pliers. The device of the present invention, however, is able to perform this function, along with the process of cleaving the fiber as discussed above and optionally crimping the compressible member of the connector as described below. To this end, in one embodiment, the clamper 107 comprises first and second dies 107a, 107b. The dies are essentially the same as those used in the crimping tool described above and are configured to receive either end of the connector. The dies are operatively connected to one or more levers 110, such that moving the levers 110 causes the dies to move toward each other, thereby actuating the clamping mechanism of the connector.

In one embodiment, the connector retainer 106 also comprises a crimper 108 for crimping a compressible member at the back of the connector 501 (see FIG. 5) to secure the connector to the buffered portion of the fiber. Again, such a crimping function is well known, although traditionally it had been performed after the clamping mechanism of the connector was actuated. The device of the present invention, however, is configured to perform this function along with the process of cleaving the fiber and actuating the connector as described above. In one embodiment, the crimping is performed simultaneously with the clamping action of the clamper 107. For example, referring to FIG. 2, the crimper 108 comprises crimping elements 108a and 108b which are biased opened with springs and are operatively connected to levers 110 along with the clamper 107 described above. When the levers 110 are actuated, in addition to compressing the dies 107a, 107b as described above, the levers also cause the crimp elements 108a, 108b to compress thereby crimping the compressible member disposed between them.

Like the cleaver 104, the connector retainer 106 is slidably attached to the substrate such that once the fiber is cleaved, the cleaver may be slide out of the way and the connector retainer 106 slid in place such that the fiber channel of the connector is aligned along the x axis. Like the fiber retainer, the connector retainer may be attached to the substrate either directly or indirectly.

Figure 5:
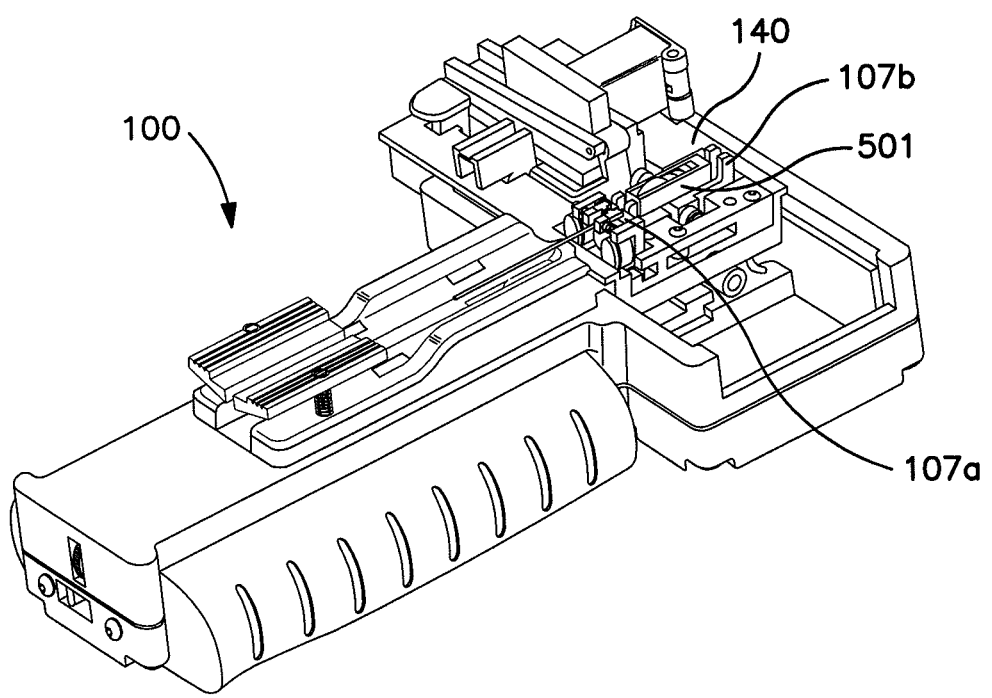
FIG. 5 shows rear quarter perspective view of the device of FIG. 1 with the platform in position to provide the fiber with access to a connector held by the device.

In the embodiment shown in FIG. 1, the cleaver 104 and the connector retainer 106 are mounted on a common platform 140 which is configured to slide along the y axis on y rails 131 defined in the substrate 101. Such an embodiment simplifies the operation of the device by simultaneously moving the cleaver 104 away from the x axis when the connector retainer 106 is slid in place as shown in FIG. 5. It should be understood, however, that other embodiments are possible. For example, rather than mounting the cleaver 104 and the connector retainer 106 on a common platform 140, they might be mounted individually on the y track 131. In another embodiment, either the cleaver or the connector retainer remains stationary and the other component slides along the y axis in front of it. For example, in one embodiment, the cleaver is stationary and the connector retainer is configured to slide in front of it (relative to the fiber retainer) after the fiber is cleaved. In another embodiment, the cleaver is in front of a stationary connector retainer such that, after the fiber is cleaved, the cleaver is slid out of the way to present the fiber channel of the connector held in the stationary connector retainer. Still other embodiments will be known to one of skill in the art in light of this disclosure.

In one embodiment, the device 100 comprises a receptacle 111 located adjacent the cleaver to "catch" the bare fiber remnant once it is cleaved. By containing the cleaved remnants, the nuisance s and injury risk they present is avoided.

Device 100 facilitates a method of terminating any field installable connector using just a single device in essentially one operation. More specifically, referring FIGS. 1-4, the steps of the method of the present invention are described in detail with respect to a connector termination.

First, a field-installable connector is secured to the device 100 by the connector retainer 106. Although securing the connector to the device 100 is described herein as the first step, it need not be done until after the fiber is cleaved as described below.

A stripped fiber in which a bare fiber portion extends from a buffered portion is disposed in the groove 103 and is slid toward the cleaver, which is positioned such that its fiber channel is aligned with the x axis. The arm 121 of the cleaver 104 is raised to allow the bare fiber access to the fiber channel 105. The fiber retainer is pushed forward in the groove 103 until the buffered portion of the fiber abuts the buffer stop 190. In this position, the bare fiber protrudes from the buffered fiber into the cleaver 104.

After the fiber is positioned in groove 106 and the bare fiber extends into the cleaver 104, the cable is secured using fiber retainer 102. In one embodiment, the fiber retainer is secured to the fiber at a particular location along the x axis, referred to as the first position. It is important that the fiber be straight at this point. In other words, there should be no bends in the fiber from the cleaver 104 to the fiber retainer 102. It is also preferable for the retainer to be in the same plane as the cleaver 104. To this end, the fiber retainer cooperates with the substrate to hold the fiber in the same plane as the fiber channel 105.

Once the fiber is in positioned and secured by the fiber retainer 102, the cleaver 104 is actuated by pushing the arm 121 down toward the anvil and sliding the blade across the fiber. As described above, pushing the arm down causes the anvil to urge against the fiber, bending it, such that, when the blade score the top of the fiber, the fiber immediately snaps along the score.

The bare fiber remnant can be discarded at this point. In one embodiment, a receptacle 111 is located adjacent the cleaver to "catch" the bare fiber remnant once it is cleaved.

Once the fiber is cleaved, the arm 121 is lifted and the angle-cleaved fiber is removed by sliding the fiber retainer 102 away from the cleaver 104. Next, the platform 140 is slid such that the connector retainer 106 is positioned along the x axis such that the fiber channel of the connector 501 is aligned with the x axis and thus the fiber.

While the fiber remains secured to the device by fiber retainer 102, the fiber retainer is moved toward the connector retainer such that the cleaved fiber end is inserted in the fiber channel of the connector until the cleaved end contacts the fiber stub within the connector. It is desirable that a bend or buckle be introduced in the fiber to create a forward bias and thereby ensure proper pressure at the optical coupling of the angled cleave end and the fiber stub. Such a bend or buckle is formed preferably by positioning the connector such that it is closer to the fiber retainer 102 than the cleaver 103 was. This way, the fiber bends when inserted into the connector 105 if the fiber retainer is returned to the first position mentioned above.

Once the cleaved fiber is inserted into connector 105, the connector 105 is actuated to secure the fiber to the connector. To this end, the levers 110 are squeezed together by the user, thereby causing the first and second dies 107a, 107b to move toward each other, thereby actuating the connector held between the dies. This way, the fiber is held in intimate contact with the fiber stub by virtue of a clamping mechanism in the connector, which applies a radial force to the terminating fiber to secure it to the connector. Advantageously, this clamping mechanism facilitates straightforward field assembly by obviating the need to handle epoxy and for curing ovens during field termination. Tyco Electronics (Harrisburg, Pa.) offers a family of field-installable connectors that are axially-actuated (see, for example, US Application No. 20070127873, which is hereby incorporated by reference). These field-installable connectors are available, for example, as SC and LC type connectors.

In one embodiment, to reduce the number of dies required for different connector types, the second die 107b is configured to interengage with a ferrule cap as disclosed in U.S. Pat. No. 7,988,367, incorporated herein by reference.

Squeezing the levers 110 also causes the crimp elements 108a, 108b to move together, thereby crimping a compressible member of the connector disposed therebetween to the buffered fiber. The compressible member may be, for example, a compressible member or a plunger. In this way, the device 100 enables a user to cleave a fiber, actuate the connector to clamp the fiber, and crimp the compressible member around the fiber using one tool. Furthermore, in one embodiment, the clamping and crimping functions are performed simultaneously.

It should be understood that the description above provides illustrative embodiments of the present invention and other embodiments exist.

What is claimed is:

1. A method of terminating a fiber in a connector using a device having a substrate with x and y axes, said fiber being stripped to present a bare fiber portion extending from a buffered portion, said method comprising:
   (a) positioning a stripped fiber on said device such that said bare fiber portion extends into a first fiber channel of a cleaver;
   (b) securing said fiber to a fiber retainer slidably attached to said substrate to move along said x axis at a first position on said x axis;
   (c) cleaving said bare fiber portion to form a cleaved end;
   (d) sliding said fiber retainer away from said cleaver along said x axis;
   (e) causing to be presented a second fiber channel of a connector held between first and second dies in a connector retainer along said x axis;
   (f) sliding said fiber retainer to said first position along said x axis, thereby causing said cleaved end to extend into said second fiber channel; and
   (g) actuating said first and second dies to move toward each other, thereby compressing said connector held between said first and second dies and thereby clamping said cleaved end to said connector.

2. The method of claim 1, wherein, in step (e), said second fiber channel is presented by at least one of the following actions (i) sliding said cleaver along said y-axis away from said x axis, (ii) sliding said connector retainer along said y-axis such that said second fiber channel is aligned with said x axis, or (iii) a combination of (i) and (ii).

3. The method of claim 2, wherein, in step (e), said second fiber channel is presented by sliding said cleaver along said y-axis away from said x axis and sliding said connector retainer along said y-axis to align said second fiber channel with said x axis.

4. The method of claim 3, wherein said cleaver and said connector retainer are mounted on a common platform that slides along said y-axis.

5. The method of claim 1, further comprising:
   (h) crimping a compressible member on said connector around said buffered portion of said fiber.

6. The method of claim 5, wherein steps (g) and (h) are performed simultaneously with one action of said device.

7. The method of claim 6, wherein said one action involves actuating a lever.

8. The method of claim 1, wherein, in step (f), said cleaved end contacts a fiber stub in said connector before said fiber retainer reaches said first position, thereby causing said fiber to bend when said fiber retainer reaches said first position.

9. The method of claim 1, wherein said substrate comprises an x track along said x axis and a y track along said y axis.

10. The method of claim 1, wherein said first position is an extreme point of travel for said fiber retainer along the x track.

11. The method of claim 1, wherein, in step (c), wherein a cleaved portion of said bare fiber portion is captured in a receptacle.

12. A device for field termination of optical connectors, said device comprising:
    a substrate defining x and y axes;
    a fiber retainer slidably attached to said substrate to slide along said x axis;
    a cleaver having a first fiber channel and being slidably attached to said substrate to slide along said y axis; and
    a connector retainer for holding a connector having a second fiber channel and presenting said second fiber channel along said x axis, wherein said connector retainer being slidably attached to said substrate to slide along said y axis.

13. The device of claim 12, wherein said substrate comprises a groove between said fiber retainer and said cleaver, said groove comprising a stop to abut the end of said buffered portion of said fiber.

14. The device of claim 13, wherein said groove, a first fiber channel and said second fiber retainer are essentially on a common xy plane.

15. The device of claim 12, further comprising a receptacle adjacent said cleaver to catch fiber cutoffs after cleaving.

16. The device of claims 12, further comprising at least one lever, and wherein said connector retainer comprises first and second dies, said first and second dies being configured to hold ends of a connector and being operatively connected to said lever such that actuating said lever causes said first and second dies to move toward each other, thereby compressing a connector held therebetween and thereby actuating the connector to clamp onto said fiber.

17. The device of claims 16, wherein said connector retainer comprises first and second crimping elements, said first and second crimping elements being biased opened and configured to receive a compressible member of a connector in an open position, said first and second crimping elements being operatively connected to said lever such that actuating said lever causes said first and second crimping elements to move toward each other, thereby crimping said compressible member disposed between them and thereby securing said connector to said fiber.

18. The device of claims 17, wherein said actuation simultaneously moves said first and second dies and said first and second crimping elements.

19. The device of claims 12, further comprising a common platform upon which said cleaver and said connector retainer are mounted.

* * * * *